(12) United States Patent
Sherman (10) Patent No.: US 8,695,227 B2
(45) Date of Patent: Apr. 15, 2014

(54) WORK PIECE CUTTING GUIDE

(76) Inventor: Gary Sherman, Collegeville, PA (US)

(*) Notice: Subject to any disclaimer, the term of this patent is extended or adjusted under 35 U.S.C. 154(b) by 169 days.

(21) Appl. No.: 13/365,552

(22) Filed: Feb. 3, 2012

(65) Prior Publication Data
US 2012/0198717 A1    Aug. 9, 2012

Related U.S. Application Data

(60) Provisional application No. 61/439,406, filed on Feb. 4, 2011.

(51) Int. Cl.
*G01B 3/10* (2006.01)
(52) U.S. Cl.
USPC .......................................................... 33/760
(58) Field of Classification Search
USPC .................................................. 33/760, 640
See application file for complete search history.

(56) References Cited

U.S. PATENT DOCUMENTS

| | | | |
|---|---|---|---|
| 2,571,569 A | 10/1951 | Greenwood | |
| 3,192,630 A * | 7/1965 | Dineson | 33/42 |
| 3,645,307 A | 2/1972 | Stocker | |
| 3,651,574 A * | 3/1972 | Burkart | 33/1 SB |
| 3,869,951 A | 3/1975 | Litwin | |
| 4,016,649 A | 4/1977 | Kloster | |
| 4,356,748 A | 11/1982 | Tilton | |
| 4,418,902 A | 12/1983 | Genge | |
| 4,557,170 A | 12/1985 | Ingham | |
| 4,624,054 A | 11/1986 | Edwards | |
| 4,642,898 A * | 2/1987 | Miller | 33/761 |
| 4,751,865 A | 6/1988 | Buckalew | |
| 4,790,072 A | 12/1988 | Edwards | |
| 4,890,393 A | 1/1990 | St. Jean | |
| 4,901,444 A | 2/1990 | Maschmeier | |
| 5,000,237 A | 3/1991 | Berkeley et al. | |
| 5,063,802 A | 11/1991 | Shiotani et al. | |
| 5,113,596 A | 5/1992 | Meyers | |
| 5,271,159 A | 12/1993 | Chen et al. | |

(Continued)

FOREIGN PATENT DOCUMENTS

WO    WO2006023642 A2    3/2006

OTHER PUBLICATIONS

International Search Report; Mailed May 15, 2012 for corresponding PCT Application No. PCT/US2012/023764.

(Continued)

*Primary Examiner* — Yaritza Guadalupe-McCall
(74) *Attorney, Agent, or Firm* — Mendelsohn, Drucker & Dunleavy, P.C.; Craig M. Brown; Kevin M. Drucker (57) ABSTRACT

In one embodiment, a cutting guide has a base with a flat lower surface for resting the cutting guide on an upper surface of a work piece. Extending down from the front of the base is an abutment member that aligns the base with a front surface of the work piece. A fence is installed on the upper surface of one side of the base to guide a cutting instrument across the work piece. A kick-up preventer extends from the top of the fence away from the base to prevent the cutting instrument from kicking-up during operation. On the other side of the base, a tape measure is mounted on the upper surface such that the tape extends away from the fence, and a measurement-securing assembly is mounted in front of the tape measure to secure the tape measure at a desired measurement.

22 Claims, 6 Drawing Sheets

(56) References Cited

U.S. PATENT DOCUMENTS

| | | | | |
|---|---|---|---|---|
| 5,390,425 | A | 2/1995 | Gilberts | |
| 5,406,711 | A * | 4/1995 | Graham | 33/42 |
| 5,472,029 | A | 12/1995 | Ketch | |
| 5,481,810 | A | 1/1996 | Hastings et al. | |
| 5,515,617 | A * | 5/1996 | Canfield | 33/768 |
| 5,782,007 | A | 7/1998 | Harris | |
| 5,787,599 | A | 8/1998 | Clifton | |
| 5,848,481 | A | 12/1998 | Parsons et al. | |
| 6,062,122 | A | 5/2000 | Niemczyk | |
| 6,173,631 | B1 | 1/2001 | Schock | |
| 6,226,885 | B1 * | 5/2001 | Korich | 33/760 |
| 6,256,899 | B1 * | 7/2001 | McGhee | 33/640 |
| 6,553,684 | B2 * | 4/2003 | Jenkins et al. | 33/770 |
| 6,591,509 | B2 | 7/2003 | LeBlanc | |
| 6,598,311 | B2 | 7/2003 | Noon | |
| 6,763,754 | B1 | 7/2004 | Glenn | |
| 6,868,612 | B2 | 3/2005 | Ballard | |
| 7,020,978 | B1 | 4/2006 | Nelson | |
| 7,162,809 | B2 | 1/2007 | Haas et al. | |
| 7,165,338 | B2 * | 1/2007 | Clifton | 33/640 |
| 7,219,440 | B2 * | 5/2007 | Lewis et al. | 33/760 |
| 7,228,644 | B1 | 6/2007 | Hellem et al. | |
| 7,254,899 | B2 * | 8/2007 | Marocco et al. | 33/760 |
| 7,373,732 | B2 | 5/2008 | Baida | |
| 7,430,810 | B2 | 10/2008 | Sergyeyenko et al. | |
| 7,484,313 | B1 | 2/2009 | Ogilvie | |
| 7,658,012 | B2 | 2/2010 | James et al. | |
| 7,676,950 | B2 | 3/2010 | Ogilvie | |
| 7,740,425 | B2 | 6/2010 | Zeiler et al. | |
| 7,757,592 | B2 | 7/2010 | Wilson | |
| 7,841,092 | B2 | 11/2010 | Dern | |
| 7,997,312 | B2 * | 8/2011 | Van Valkenburg | 33/638 |
| 8,020,312 | B1 * | 9/2011 | McGahan | 33/770 |
| 2003/0037453 | A1 | 2/2003 | Mastrobattista | |
| 2006/0137202 | A1 * | 6/2006 | Clifton | 33/640 |
| 2006/0196072 | A1 | 9/2006 | Lewis et al. | |
| 2008/0201975 | A1 | 8/2008 | Gingerella et al. | |
| 2009/0031571 | A1 * | 2/2009 | Ogilvie | 33/456 |
| 2010/0224046 | A1 | 9/2010 | Osbourne | |
| 2012/0073152 | A1 * | 3/2012 | McGahan | 33/32.3 |
| 2012/0198717 | A1 * | 8/2012 | Sherman | 33/760 |

OTHER PUBLICATIONS

Pro-Cut Portable Saw Guide; [retrieved on Mar. 5, 2012]. Retrieved from the internet: <URL: http://www.benchdog.com/procut.cfm>.

* cited by examiner

WORK PIECE CUTTING GUIDE

CROSS-REFERENCE TO RELATED APPLICATIONS

This application claims the benefit of the filing date of U.S. provisional application No. 61/439,406, filed on Feb. 2, 2011, the teachings of which are incorporated herein by reference in their entirety.

BACKGROUND OF THE INVENTION

1. Field of the Invention

The present invention relates to the measurement and cutting of work pieces, and, more specifically but not exclusively, to apparatuses that may be used to guide movement of a cutting instrument, such as a circular saw, across a work piece at a desired measurement from an edge of the work piece.

2. Description of the Related Art

Circular saws can be difficult and dangerous to use for a number of reasons. For example, circular saws typically include a cutting guide that requires the user to stand very close to the circular saw and to lean over the saw in order to view the cutting guide. This is because the cutting guide is conventionally located on the opposite side of the circular saw, away from the user. This further requires the user to place his or her abdomen, waist, leg and/or thigh closer to the circular saw blade, while simultaneously concentrating on keeping the cutting guide on a line that was previously drawn on the work piece, to result in a somewhat even, but not necessarily accurate, cut. As one of *Popular Mechanics* magazine's top five most dangerous tools, the circular saw's blade travels at 120 miles per hour and is a major cause of injury, especially to "do-it-yourselfers." Although professional carpenters might be more prepared to handle the hazards of using a circular saw due to their experience with the tool, even carpenters suffer from daily fatigue that increases as the long workday progresses, as well as exposure to the elements of a typical outdoor or construction-site work environment. These factors contribute to the likelihood of accidental injury from circular saw use, even among experienced users.

Circular-saw kick-up and kickback can be a dangerous problem. Kick-up occurs when the circular blade of a power saw binds or grabs a work piece being cut, which throws the spinning saw and its cutting blade up toward the user. Similarly, kickback occurs when the circular blade of a power saw binds or grabs a work piece being cut, which throws the spinning saw and its cutting blade back toward the user. Typically, the kick-up and kick-back motion occur together such that the saw is forced away from the surface of the work piece and backward toward the user. The motion of kick-ups and kickbacks can occur so quickly as to make it difficult or impossible for the user to avoid injury. Although various guides for circular saws are known, none of these guides provide protection for the user from kick-ups and kickbacks.

U.S. Pat. No. 7,020,978 to Nelson discloses an adjustable tool guide that provides no protection from circular-saw kickback. This tool guide is used in conjunction with a clamp that holds the tool guide in position over the work piece, so that the user can place both hands on the circular saw. Disadvantageously, this procedure adds an extra step that slows the cutting process, and further, the '978 patent does not specifically address the potential for harm to the user due to kick-up, kickback, or other safety concerns. In practicality, professional users seldom clamp down their smaller work piece and instead usually hold the work piece with one hand while holding the circular saw with the other. This scenario provides little protection from circular saw kick-up and kickback and increases the user's exposure to the moving blade. Further, although the tool guide of the '978 patent has an integrated tape measure with means for adjusting the effective extension length of the tape with respect to the guide, this arrangement can be unreliable because the tape adjustment assembly is pulled against the work piece each time the device is used. This pulling of the tape adjustment assembly promotes and repeatedly increases the potential for inaccuracy due to loss of calibration. To ensure accuracy in the cutting process and subsequent results, the tool guide of the '978 patent must constantly be recalibrated, e.g., by manually verifying the tape adjustment assembly using a second tape measure. Also, since most users do not own multiple circular saws, adjustability of the tool guide can be more of a detriment than a benefit, due to this constant recalibration necessitated by a number of moving parts.

U.S. Pat. No. 6,393,710 to Hastings discloses a combination tape measure and straight-edge apparatus that provides no kick-up or kickback protection from a circular saw. Unless the device is made to be extremely large, passing a circular saw adjacent to the device can be difficult. This is because the tape-measure mounting device is stationary and centrally positioned within the device, thereby providing insufficient clearance for a circular saw motor to pass by the mounted tape measure. The '710 patent provides no means for positioning the tape measure further away from the circular saw in a way that provides the necessary clearance.

U.S. Pat. No. 4,483,071 to Te Kolste also discloses a power-driven circular-saw guide that provides no kick-up or kickback protection. The device of the '071 patent includes a built-in, fully-extended measuring device or rule permanently mounted and extended to the length of the device. The size limitation of the device that is necessary to make the device portable and easy to carry limits the length of material that can be cut, making the cutting of commonly-available building material (for example, 2"×4" framing lumber in 6- to 16-foot lengths) impractical. The device also includes a wing-nut clamp that needs constant attention to ensure cutting-length accuracy.

U.S. Patent Application Pub. No. 2007/0277389 also discloses an attachable circular-saw guide that provides no kick-up or kickback protection. The device of the '389 application is an attachment to a circular saw that increases the saw's handling weight. Moreover, the '389 application discloses a device for cutting a workpiece at various angles that limits the length of material being cut, making the cutting of commonly-available building material (for example, 2"×4" framing lumber in 6- to 16-foot lengths) impractical.

SUMMARY OF THE INVENTION

In one embodiment, the present invention is an apparatus adapted to guide movement of a cutting instrument across a work piece at a desired measurement from an edge of the work piece. The apparatus comprises a base, an abutment member, a fence, a kick-up preventer, a tape-measure mount, and a measurement-securing assembly. The base has a lower surface that is substantially flat, where the lower surface is adapted to abut a first surface of the work piece. The abutment member extends from a first side of the base below the lower surface, and the abutment member adapted to align the apparatus with a second surface of the work piece. The fence is disposed on the base at an angle relative to the first side of the base, and the fence is adapted to guide the movement of the cutting instrument across the first surface of the work piece. The kick-up preventer extends from the fence away from the base, and the kick-up preventer is adapted to prevent the cutting instrument from kicking away from the first surface of the work piece. The tape-measure mount is adapted to mount a tape measure above an upper surface of the base.

In another embodiment, the present invention is an apparatus adapted to guide movement of a cutting instrument across a work piece at a desired measurement from an edge of the work piece. The apparatus comprises a base, an abutment member, a fence, a kick-up preventer, a tape measure, and a measurement-securing assembly. The base has a lower surface that is substantially flat, where the lower surface adapted to abut a first surface of the work piece. The abutment member extends from a first side of the base below the lower surface, and the abutment member is adapted to align the apparatus with a second surface of the work piece. The fence is disposed on the base at an angle relative to the first side of the base, and the fence is adapted to guide the movement of the cutting instrument across the first surface of the work piece. The kick-up preventer extends from a top of the fence away from the base such that, when the cutting instrument is guided across the work piece, a portion of the cutting instrument passes under the fence preventing the cutting instrument from kicking away from the first surface of the work piece. The tape measure is mounted above an upper surface of the base. The measurement-securing assembly is adapted to secure a tape of the tape measure to the apparatus when the tape is extended to the desired measurement by applying a force to the tape. Further, the measurement-securing assembly extends above the upper surface of the base and is separate from the tape measure. Yet further, the measurement-securing assembly comprises an upper body that does not rotate relative to the tape, wherein an edge of the upper body provides a site guide adapted to secure the tape at the desired measurement.

In yet another embodiment, the present invention is an apparatus adapted to guide movement of a cutting instrument across a work piece at a desired measurement from an edge of the work piece. The apparatus comprises a base, an abutment member, a fence, a tape-measure mount, and a measurement-securing assembly. The base has a lower surface that is substantially flat, where the lower surface is adapted to abut with a first surface of the work piece. The abutment member extends from a first side of the base below the lower surface, and the abutment member is adapted to align the apparatus with a second surface of the work piece. The fence is disposed on the base at an angle relative to the first side of the base, and is adapted to guide the movement of the cutting instrument across the first surface of the work piece. The tape-measure mount is adapted to mount a tape measure above an upper surface of the base. The measurement-securing assembly extends above the upper surface, is separate from the tape measure, and is adapted to secure a tape of the tape measure to the apparatus when the tape is extended to the desired measurement.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
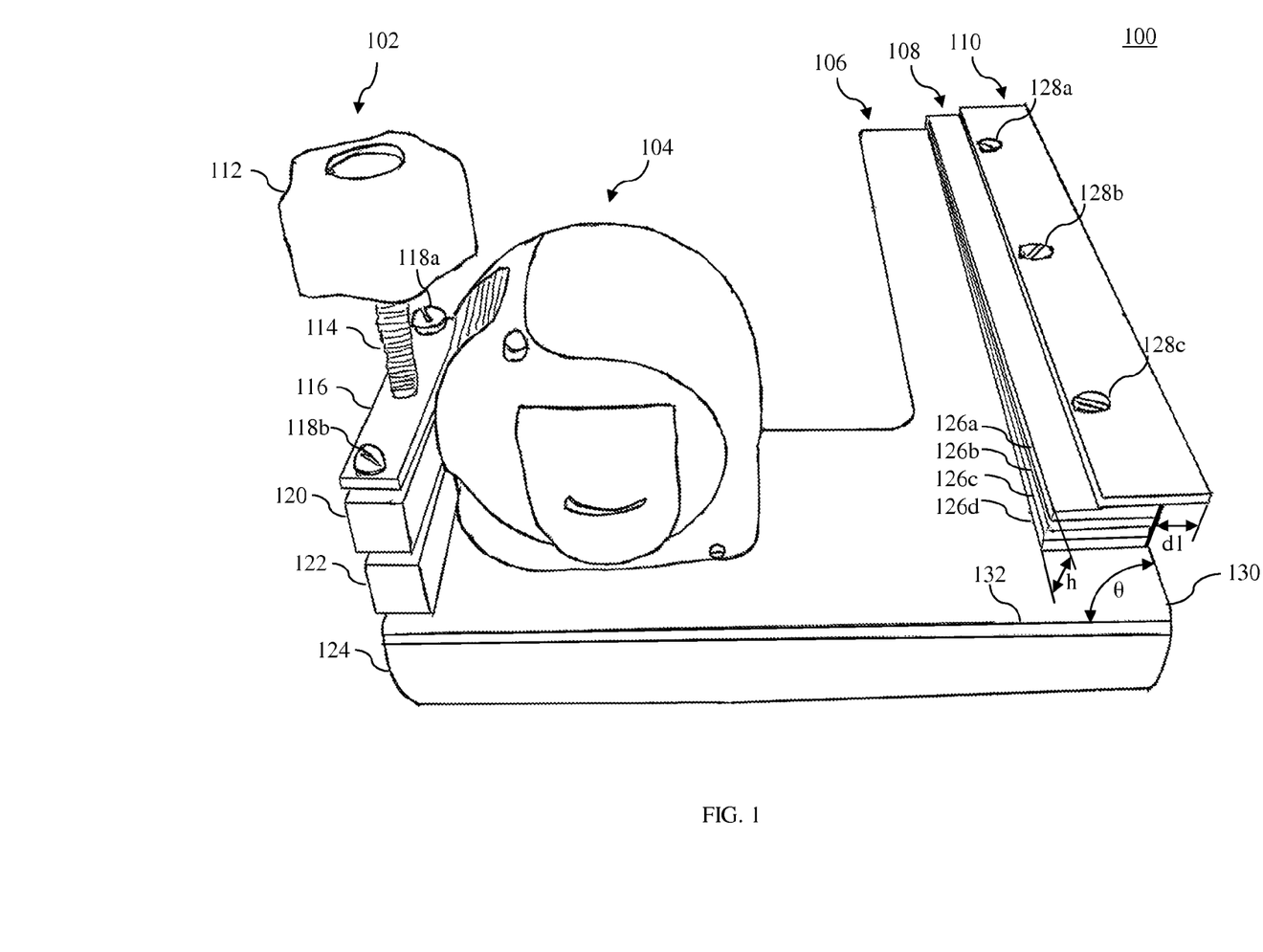
FIG. 1 shows a front perspective view of a cutting guide according to one embodiment of the present invention.
Figure 2:
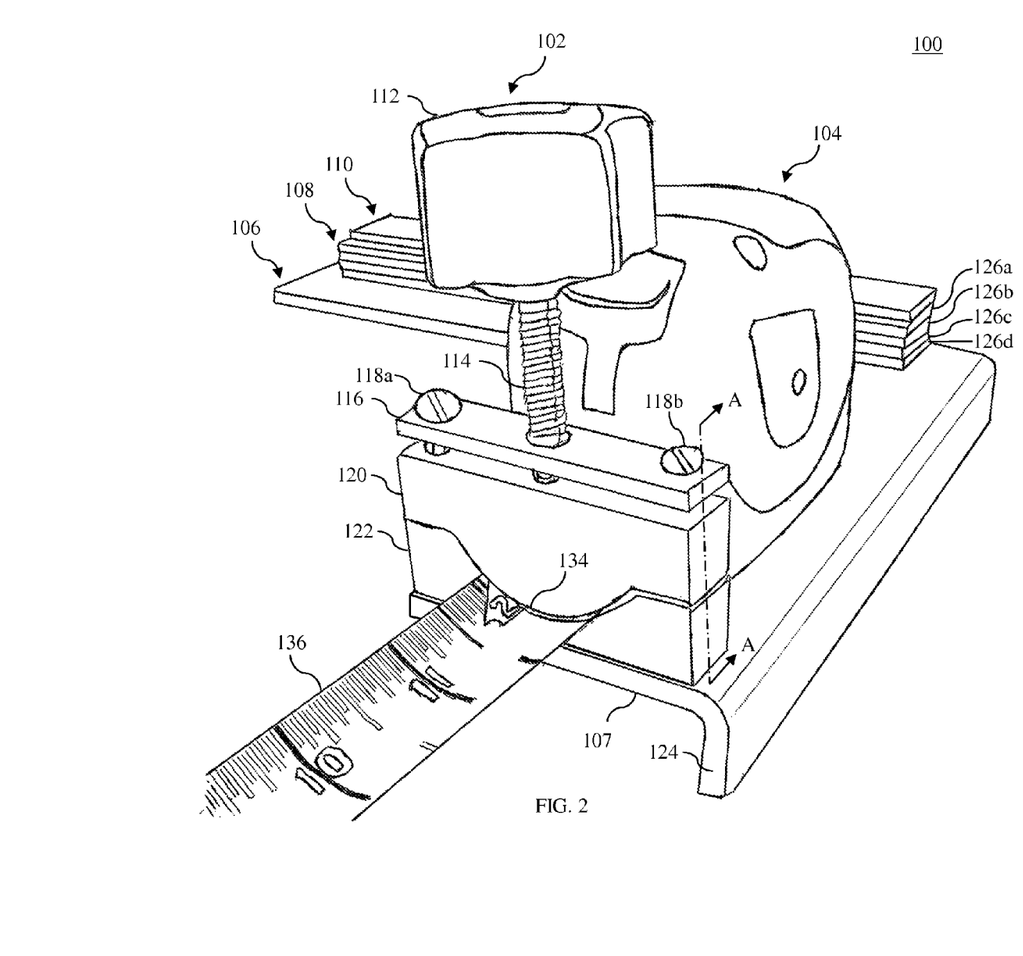
FIG. 2 shows a left-side perspective view of the cutting guide of FIG. 1.

FIG. 1 shows a front perspective view of a cutting guide 100 according to one embodiment of the present invention, and FIG. 2 shows a left-side perspective view of cutting guide 100. As described in further detail below, cutting guide 100 may be used to (i) measure a desired length of a work piece, such as a piece of wood, siding, or other suitable work piece, and (ii) guide movement of a cutting instrument such as a circular saw, jig saw, router, or other cutting instrument across the work piece at the desired length.

Cutting guide 100 includes measurement a securing assembly 102, a tape measure 104, a base 106, a fence 108, and a kick-up preventer 110. Base 106, which may be constructed from a material such as metal, plastic, wood, or any other material or combination of materials suitable for holding securing assembly 102, tape measure 104, fence 108, and a kick-up preventer 110, has a substantially flat lower surface 107 (See FIG. 2) so that base 106 may be positioned flat against the cutting surface of the work piece. Base 106 also has a substantially straight front side 132 and a substantially straight right side 130, which extends from the right end of front side 132 at an angle θ. In this embodiment, angle θ is approximately 90 degrees and base 106 is a substantially L-shaped plate.

An abutment member 124, which may be used to align cutting guide 100 flat against a front surface of the work piece that is perpendicular to the cutting surface, extends across the entire length of front side 132 below lower surface 107 of base 106. In this embodiment, abutment member 124 is integral to base 106 and is formed by bending base 106 to a substantially right angle.

Tape measure 104 is attached to the upper surface of base 106 such that tape 136 releases in a direction that is away from right side 130 of base 106. Tape measure 104 may be attached using any suitable method. For example, one or more holes may be formed in base 106. Tape measure 104 may then be mounted by passing screws through the one or more holes in base 106 and into the bottom of tape measure 104. To further strengthen the attachment of tape measure 104 to base 106, a plate (not shown) having tapped holes that align with the one or more holes in base 106 may be installed within tape measure 104 to receive the screws. As another example, a separate tape measure holder (not shown) may be constructed and attached to base 106. For purposes of this application, the term "tape-measure mount" refers to the mechanism used to attach tape measure 104 to base 106, such as the one or more holes formed in base 106 or the separate tape measure holder discussed above. Preferably, when tape measure 104 is mounted to base 106, tape measure 104 is not moveable relative to base 106 so that the calibration of cutting guide 100 is not lost. Calibration of cutting guide 100 is discussed in further detail below.

When tape 136 of tape measure 104 is extended to a desired distance, the position of tape 136 is secured using measurement-securing assembly 102. Measurement-securing assembly 102 is attached on the left side of the upper surface of base 106 and adjacent to the opening in tape measure 104 where tape 136 is released. To further understand the operation of measurement-securing assembly 102, consider FIGS. 2 and 3.

Figure 3:
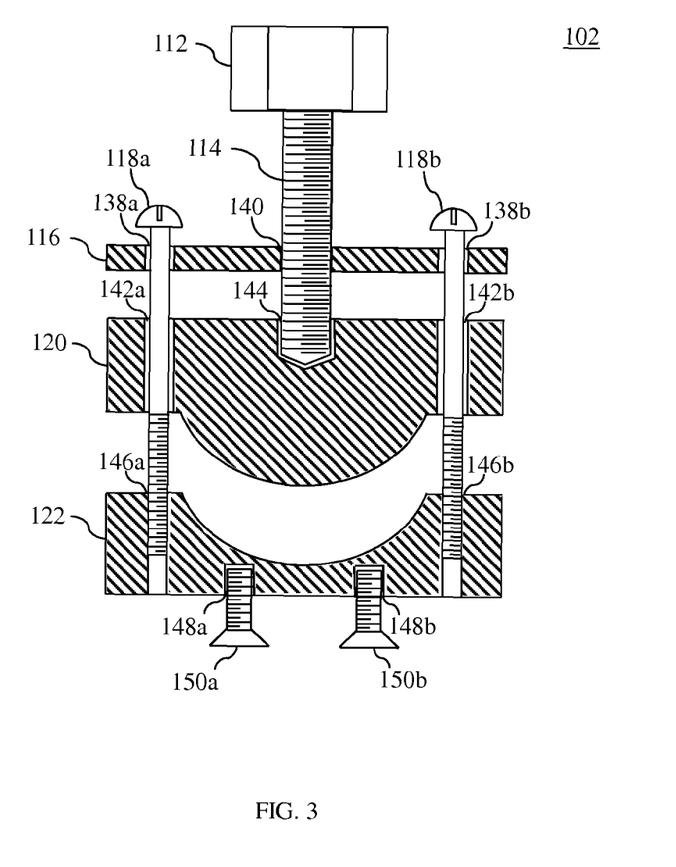
FIG. 3 shows a section view of the measurement-securing assembly in FIGS. 1 and 2 according to one embodiment of the present invention.

FIG. 3 shows a section view A-A of measurement-securing assembly 102 according to one embodiment of the present invention. Measurement-securing assembly 102 includes plate 116, an upper body 120, and a lower body 122, which may be constructed using metal, wood, plastic, or any other material or combination of materials suitable for securing tape 136. Plate 116, upper body 120, and lower body 122 are secured together using screws 118a and 118b, which prevents plate 116, upper body 120, and lower body 122 from rotating relative to one another. Screw 118a passes through (i) hole 138a in plate 116 and (ii) hole 142a in upper body 120, both of which are not tapped, and screws into hole 146a in lower body 122, which is tapped. Similarly, screw 118b passes through (i) hole 138b in plate 116 and (ii) hole 142b in upper body 120, both of which are not tapped, and screws into hole 146b in lower body 122, which is tapped. This configuration allows plate 116 and upper body 120 to slide axially relative to screws 118a and 118b between lower body 122 and the heads of screws 118a and 118b.

In addition, measurement-securing assembly 102 has a handle 112, which is fixedly attached to threaded rod 114 such that, when handle 112 is turned, threaded rod 114 turns with handle 112. Threaded rod 114 is screwed through hole 140 in plate 116, which is threaded, and the bottom of threaded rod 114 passes into hole 144 in upper body 120, which is not threaded.

Measurement-securing assembly 102 is secured to the upper surface of base 106 of cutting guide 100 by inserting screws 150a and 150b through corresponding holes in base 106 and into holes 148a and 148b of lower body 122, which are tapped, such that base 106 is trapped between the heads of screws 150a and 150b and lower body 122.

In operation, upper body 120 may be clamped down onto lower body 122, securing tape 136 between upper body 120 and lower body 122, by turning handle 112 such that threaded rod 114 screws further into hole 140 of plate 116. This in turn forces the bottom of threaded rod 114 down into hole 144 of upper body 120, forcing upper body 120 down against tape 136 and lower body 122. Preferably, lower surface 107 of upper body 120 and the upper surface of lower body 122 conform to the shape of tape 136 to prevent damage to tape 136 when securing tape 136. In this particular embodiment, upper body 120 and lower body 122 are curved to conform to tape 136, which has a curved cross-section.

As upper body 120 tightens against lower body 122, the threads of threaded rod 114 begin to apply an upward force on the threads of hole 140 in plate 116. Plate 116 is preferably designed to be strong enough that plate 116 does not bend when subject to this upward force. As a result, plate 116 applies a substantially equal and opposite force to the threads of threaded rod 114, which helps to prevent threaded rod 114 from backing out when securing a desired measurement.

Referring back to FIGS. 1 and 2, fence 108 is attached to the upper surface of base 106 on the side opposite measurement-securing assembly 102. Fence 108, which serves as a guide against which the base of a cutting instrument may be forced along to make a straight cut across the work piece, may be constructed using metal, wood, plastic, or any other material or combination of materials suitable for guiding the cutting instrument. In this embodiment, fence 108 comprises four plates 126a to 126d, which may be attached to base 106 using screws, welds, or any other suitable fastening device or combination of devices. The height h of fence 108 is adjustable and may be increased by adding plates or decreased by removing plates. Preferably, height h is large enough to guide the base of the cutting instrument such that the base of the cutting instrument cannot accidentally slip on top of base 106 during a cutting operation. Further, height h is preferably small enough to prevent fence 108 from interfering with any portion of the cutting instrument that might hang over the fence, such as the motor on a circular saw.

Attached to the top of fence 108 is kick-up preventer 110, which, like fence 108, may be (i) constructed using metal, wood, plastic, or any other material or combination of materials suitable for preventing kick-up, and (ii) attached to fence 108 using screws, welds, or any other suitable fastening device or combination of devices. Kick-up preventer 110 hangs over the edge of fence 108 by a distance d1. Preferably, distance d1 is large enough that, when the base of a cutting instrument is forced along fence 108, kick-up preventer 110 would obstruct the path of the base in the event that the base of the cutting instrument kicks straight up off of the work piece. Further, distance d1 is preferably small enough to prevent kick-up preventer 110 from interfering with portions of the cutting instrument other than the base of the cutting instrument, such as the motor or handle on a circular saw. In operation, cutting guide 100 may itself be held down onto the cutting surface with the user's hand or a clamp to prevent cutting guide 100 from kicking-up along with the cutting instrument.

Figure 4:
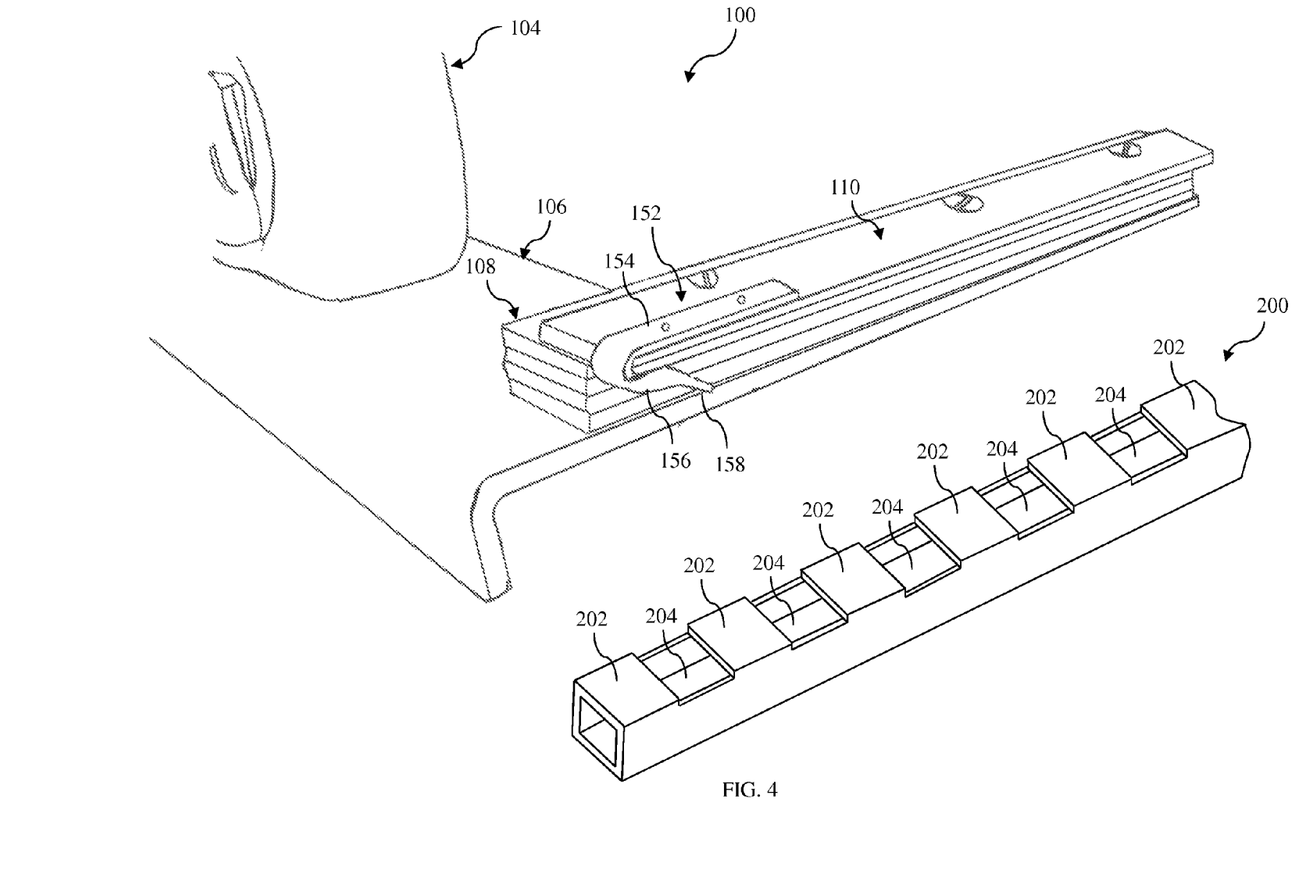
FIG. 4 shows a right-side perspective view of the cutting guide of FIG. 1 with an optional kick-back preventer according to one embodiment of the present invention.

FIG. 4 shows a right-side perspective view of cutting guide 100 with an optional kick-back preventer 152 and kick-back preventer bar 200 according to one embodiment of the present invention. Kick-back preventer 152 is a relatively thin hook that may be constructed using metal, wood, plastic, or any other suitable material or combination of materials. Kick-back preventer 152 has a flat attachment portion 154 that is used to attach kick-back preventer 152 to kick-up preventer 110, using, for example, screws, welds, or any other suitable fasteners or combination of fasteners. Kick-back preventer 152 also has curved portion 156, which (i) deflects toward attachment portion 154 when a force is applied to the bottom of curved portion 156 and (ii) springs back to the at-rest position shown in FIG. 4 when the force is removed. At the end of curved portion 156 is an engagement portion 158 that bends away from kick-up preventer 110 to facilitate engagement with kick-back preventer bar 200 as discussed below.

Kick-back preventer bar 200 is a square-shaped tube that may be constructed using metal, wood, plastic, or any other suitable material or combination of materials. On top of kick-back preventer 200, a plurality of engagement holes 204 are formed therein that are shaped to accept kick-back preventer 152. Engagement holes 204 are separated from one another and from the ends of kick-back preventer bar 200 such that tabs 202 of material remain between engagement holes 204 and on either end of kick-back preventer bar 200. Kick-back preventer bar 200 is preferably attached to base of the cutting instrument (see, for example, FIG. 5) using screws, welds, or any other suitable fasteners or combination of fasteners.

In operation, kick-back preventer bar 200, which is attached to the base of the cutting instrument, is forced along fence 108 and under kick-up preventer 110 such that kick-back preventer bar 200 slides under kick-back preventer 152. As each tab 202 of kick-back preventer bar 200 passes under engagement portion 158 of kick-back preventer 152, engagement portion 158 is forced up such that the end of engagement portion 158 slides over the tab 202. As each engagement hole 204 passes under engagement portion 158 of kick-back preventer 152, engagement portion 158 springs back to its at-rest position such that the end of engagement portion 158 rests inside engagement hole 204. If the cutting instrument kicks back toward the front of cutting guide 100, thereby forcing kick-back preventer bar 200 back toward the user, then the last tab 202 of kick-back preventer bar 200 that engagement portion 158 has passed over applies a force to the upper surface of engagement portion 158, thereby forcing engagement portion 158 down. This downward force applied to engagement portion 158 and the backward motion of kick-back preventer bar 200 causes the tab 202 to become lodged between curved portion 156 and attachment portion 154 of kick-back preventer 152. If cutting guide 100 is sufficiently secured to the work piece, then the engagement of kick-back preventer 152 with the tab 202 of kick-back preventer bar 200 will stop the cutting instrument from kicking back at the user.

Figure 5:
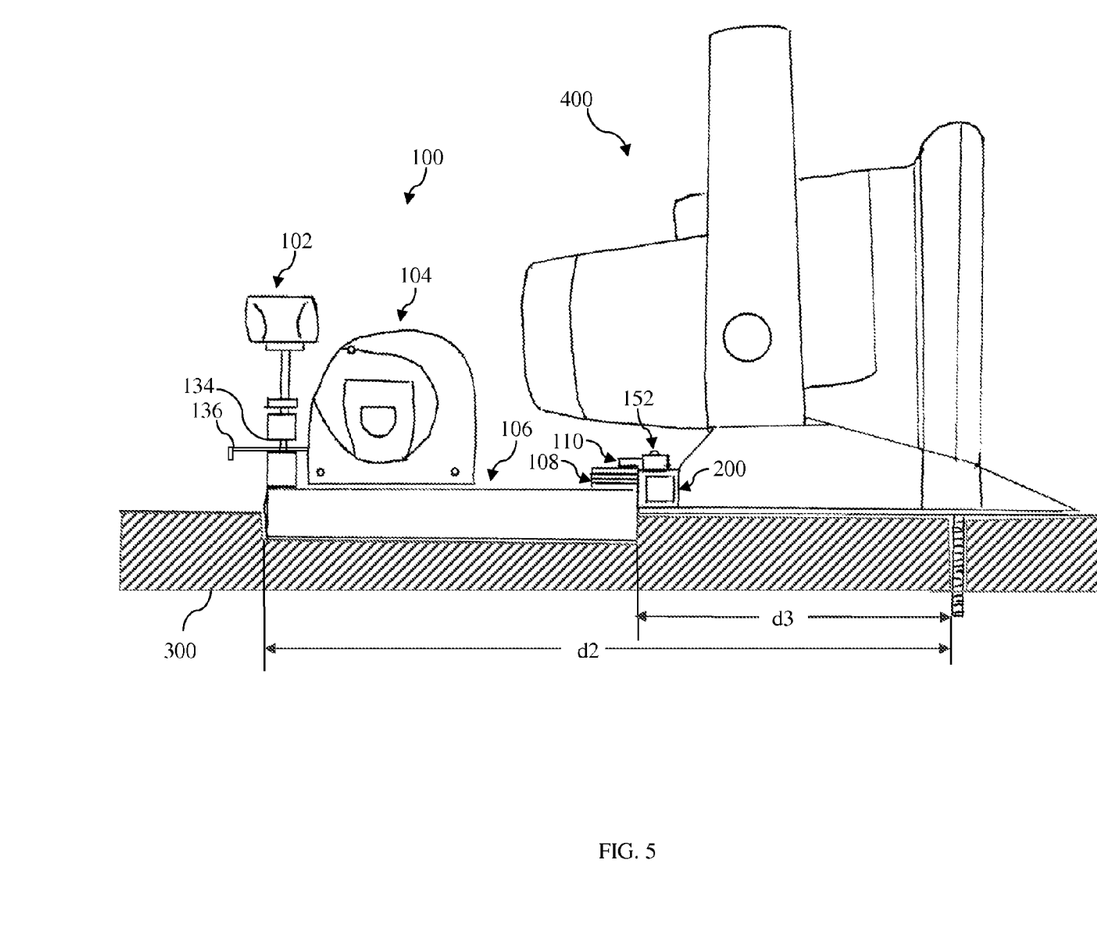
FIG. 5 shows a front view of the cutting guide of FIG. 4 installed on a work surface with a cutting instrument.

The operation of cutting guide 100 will now be discussed with reference to FIG. 5, which shows a front view of cutting guide 100 installed on work piece 300 with cutting instrument 400, which is a circular saw. In operation, the end of tape 136 is placed on one end of work piece 300. Typically, the end of a tape measure has a tab, sometimes referred to as the tang or lip, that may be used to keep the end of tape 136 positioned on the end of work piece 300. Cutting guide 100 is then pulled along work piece 300 to a desired distance from the end of work piece 300, thereby unwinding tape 136 from tape measure 104. As shown in FIG. 2, curved edge 134 of measurement-securing assembly 102 serves as a sight guide for the desired measurement. Referring back to FIG. 5, cutting guide 100 is then set into position at the desired measurement by laying the bottom surface of base 106 on the cutting surface of work piece 300 and aligning abutment member 124 against the front of work piece 300.

Once cutting guide 100 is positioned on work piece 300 and the desired measurement is aligned with sight guide 134, handle 112 is turned to secure tape 136 within measurement-securing assembly 102 at the desired distance. Securing tape 136 using measurement-securing assembly 102 eliminates the need to separately mark work piece 300 with a marking tool such as a pen or pencil. Note that, when turning handle 112, upper body 120 of measurement-securing assembly 102 moves axially along screws 118a and 118b and does not rotate. Since upper body 120 does not rotate, upper body 120 does not apply torque to tape 136 that could damage tape 136 or rub away the markings on tape 136. Further, since upper body 120 moves axially rather than rotating, alignment between sight guide 134 and the desired measurement on tape 136 can be maintained while handle 112 is being turned.

Note that measurement-securing assembly 102 preferably secures a desired measurement more securely than the locking mechanism on a typical tape measure. The locking mechanism on a typical tape measure usually provides some resistance to movement of the tape; however, this resistance can usually be overcome relatively easily by pulling on the tape with a hand. In addition, measurement-securing assembly 102 preferably secures tape 136 such that sight guide 134 aligns with the desired measurement. This allows for precise measurements. The locking mechanism on a tape measure, on the other hand, is typically located inside the body of the tape measure, and as a result, it is difficult, if not impossible, to use the locking mechanism on a tape measure as a sight guide. Thus, in typical prior art uses of a tape measure, the tape measure is extended beyond the desired measurement, the lock is applied to a point on the tape that exceeds the desired measurement, and then the work piece is marked at the desired measurement.

After securing the measurement, cutting guide 100 may be secured to work piece 300 by the user's hand or a clamp (not shown). Then, work piece 300 is cut by keeping the left edge of the circular saw 142 held tightly against fence 108 until the circular-saw blade passes through the entire work piece 300. As shown, in embodiments that have kick-back preventer bar 200 attached to the left side of the base of circular saw 142, kick-back preventer bar 200 is held tightly against fence 108 during the cutting operation. Further, kick-back preventer bar 200 travels under kick-up preventer 110 and kick-back preventer 152. While the cut is being made, the measurement on tape 136 remains visible, giving the user confidence that he or she is making the cut at the desired measurement. This is in contrast to prior art methods in which a mark is made on the work piece using a tape measure, and then the tape measure is removed. In such methods, the user might question whether or not he or she made the mark at the desired measurement.

Once measurement-securing assembly 102 secures tape 136 at the desired measurement, cutting guide 100 may be moved from one work piece to the next without disturbing the desired measurement. As a result, a plurality of work pieces can be cut at precisely the same measurement without the inaccuracies that may result from (i) separately measuring and marking each work piece and (ii) the tape measure not being sufficiently secured by the tape measure's locking mechanism. To further lock in the desired measurement, screws 118a and 118b of measurement-securing assembly 102 may be tightened.

Note that, when measuring work piece 300, there is a distance d2 from sight guide 134 to the cutting blade of circular saw 400 that is not measured by tape measure 104. This distance may vary from one cutting instrument to the next depending on the distance d3 from the end of the cutting instrument base to the cutting blade (the width d2-d3 of cutting guide 100 does not change). To ensure that distance d2 is taken into account, the user could, upon determining a desired measurement and the distance d2, (i) subtract distance d2 from the desired measurement, and (ii) secure tape 136 by aligning sight guide 134 with the resulting difference. This subtracting step would need to be performed each time a new measurement is made.

Alternatively, cutting guide 100 could be calibrated to account for distance d2 by (i) removing the tang at the end of tape 136, (ii) cutting tape 136 by distance d2, and (iii) reinstalling the tang onto the end of tape 136, using screws, rivets, or any other suitable fastener. For example, suppose that distance d2 is eleven inches. In this case, tape 136 may be cut so that the tape 136 begins at eleven inches. By calibrating tape 136, the need to subtract distance d2 from the desired measurement is eliminated, thereby, eliminating a potential source of user error. Once cutting guide 100 is calibrated to a particular cutting instrument (e.g., circular saw 400), cutting guide 100 does not need to be calibrated for that cutting instrument again.

Figure 6:
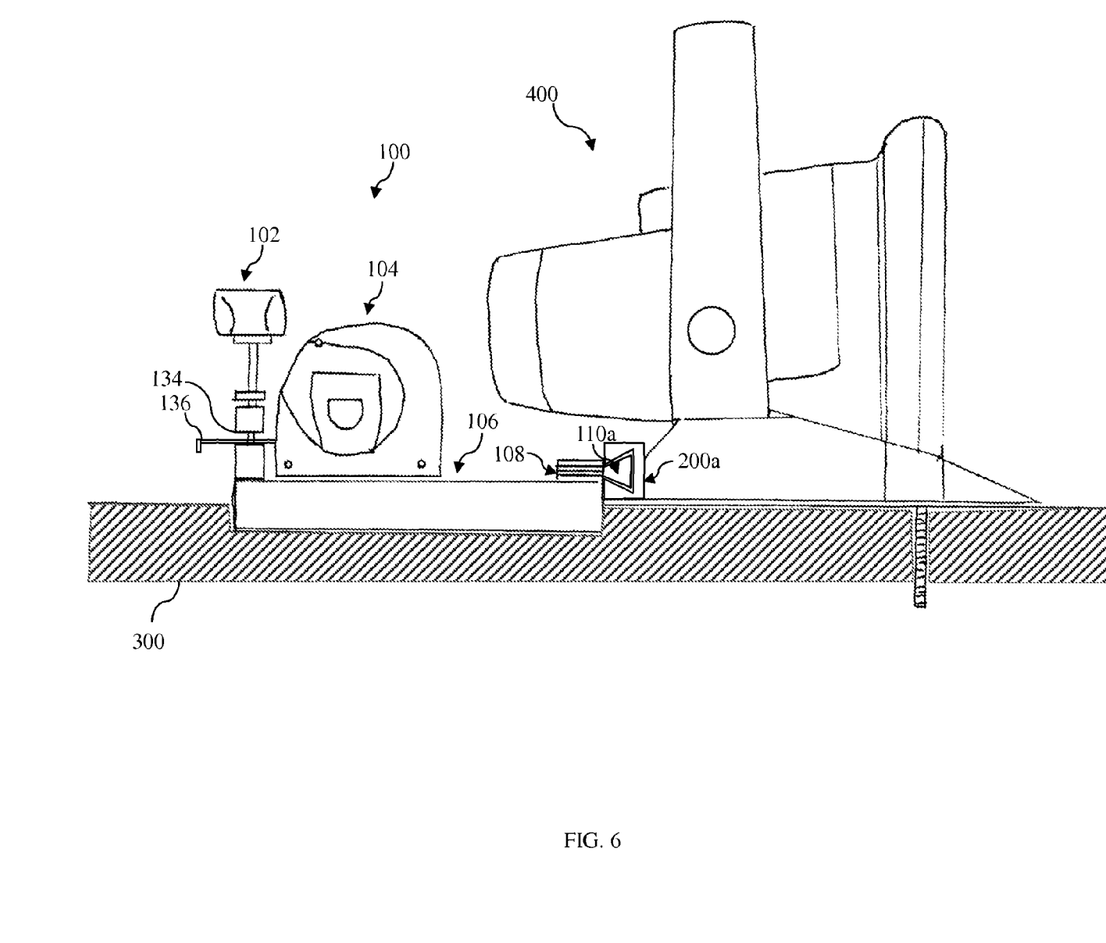
FIG. 6 shows a front view of a cutting guide installed on a work piece with a cutting instrument according to another embodiment of the present invention.

FIG. 6 shows a front view of cutting guide 100 installed on work piece 300 with cutting instrument 400 according to another embodiment of the present invention. In this embodiment, cutting guide 100 includes a kick-up preventer 110a that interlocks with a kick-up preventer bar 200a. As shown, kick-up preventer 110a extends from one side of fence 108, rather than the top of fence 108 like kick-up preventer 110 of FIGS. 1, 2, 4, and 5. Further, kick-up preventer 110a has a substantially triangular cross-section, rather than a rectangular cross section like kick-up preventer 110. Similar to kick-up preventer bar 200, kick-up preventer bar 200a is a substantially square-shaped tube. However, kick-up preventer bar 200a, also has a triangular cut-out that spans the length of kick-up preventer bar 200a. In operation, saw 400 is guided along fence 108 by mating kick-up preventer 110a with kick-up preventer bar 200a, which interlocks kick-up preventer 110a with kick-up preventer bar 200a. Interlocking kick-up preventer 110a with kick-up preventer bar 200a minimizes the chance that the kick-up preventer bar might slip out from underneath the kick-up preventer.

Although an embodiment of the present invention was described as having a base that is an L-shaped plate, the present invention is not so limited. According to alternative embodiments of the present invention, the base may be rectangular, square, triangular, irregular, or any other suitable shape. Also, in alternative embodiments, the base might not have a plate-like shape.

Further, although an embodiment of the present invention was described in which an angle θ between fence 108 and front side 132 is fixed at 90 degrees, the present invention is not so limited. For example, according to alternative embodiments, angle θ may be fixed at less than or greater than 90 degrees. Further, according to alternative embodiments, angle θ may be adjustable by, for example, moving the fence. U.S. Pat. Nos. 4,901,444 and 5,787,599, the teachings of all of which are incorporated herein by reference in their entirety, provide examples of adjustable fences that may be adapted for use with the present invention.

Yet further, although an embodiment of the present invention was described as having an abutment member 124 that is formed by bending base 106, the present invention is not so limited. According to alternative embodiments of the present invention, abutment member 124 may be formed as a separate component that is fixedly or removeably attached to base 106 using screws, welds, or any other suitable fastening device.

According to alternative embodiments of the present invention, securing devices other than measurement-securing assembly 102 may be used to secure tape 136 at a desired measurement. For example, a spring-loaded clamp may be used that secures tape 136 when the user releases the clamp.

Further, according to alternative embodiments of the present invention, fence 108 may be implemented in a manner other than that shown in FIG. 1. For example, in alternative embodiments of the present invention, fence 108 may be adjustable or non-adjustable and may be integral or non-integral to base 106. For example, fence 108 can be formed by bending a portion of base 106 in a manner similar to that of abutment member 124, albeit in the opposite direction. Then, kick-up preventer 108 could be a substantially L-shaped member, where one side of the "L" is attached to fence 108 using screws, welds, or any other suitable fastening device and the other side of the "L" extends away from base 106.

Yet further, according to alternative embodiments of the present invention, measurement-securing assembly 102 might not have lower body 122 and upper body 120 could secure tape 136 against base 106.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims. For example, various components of cutting guide 100 such as fence 108, kick-up preventer 110, and measurement-securing assembly 102 may be assembled using fasteners other than screws, including but not limited to welds.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An apparatus adapted to guide movement of a cutting instrument across a work piece at a desired measurement from an edge of the work piece, the apparatus comprising:
   a base having a lower surface that is substantially flat, the lower surface adapted to abut a first surface of the work piece;
   an abutment member extending from a first side of the base below the lower surface, the abutment member adapted to align the apparatus with a second surface of the work piece;
   a fence disposed on the base at an angle relative to the first side of the base, wherein the fence is adapted to guide the movement of the cutting instrument across the first surface of the work piece;
   a kick-up preventer extending from the fence away from the base, the kick-up preventer adapted to prevent the cutting instrument from kicking away from the first surface of the work piece; and
   a tape-measure mount adapted to mount a tape measure above an upper surface of the base.

2. The invention of claim 1, further comprising a measurement-securing assembly extending from a second side of the base, opposite the fence, wherein:
   the measurement-securing assembly is separate from the tape measure; and
   the measurement-securing assembly is adapted to secure a tape of the tape measure to the apparatus when the tape is extended to the desired measurement.

3. The invention of claim 2, further comprising the tape measure mounted to the tape-measure mount such that the tape extends away from the fence and toward the measurement-securing assembly.

4. The invention of claim 3, wherein the apparatus is calibrated by shortening length of the tape.

5. The invention of claim 4, wherein the tape is shortened based on a distance measured from the second side of the base to a cutting blade of the cutting instrument, when the cutting instrument is pressed against the fence.

6. The invention of claim 2, wherein:
the measurement-securing assembly comprises an upper body; and
the measurement-securing assembly secures the tape of the tape measure by applying a force to the tape.

7. The invention of claim 6, wherein:
the measurement-securing assembly further comprises a lower body;
the upper body has a lower surface adapted to contact an upper surface of the tape;
the lower body has an upper surface adapted to contact a lower surface of the tape; and
the upper and lower surfaces are curved to conform to a curvature of the tape.

8. The invention of claim 6, wherein the upper body does not rotate relative to the tape.

9. The invention of claim 6, wherein the measurement-securing assembly further comprises a plate adapted to prevent the force applied by the upper body from releasing when the tape is secured by the upper body.

10. The invention of claim 6, wherein an edge of the upper body provides a site guide adapted to secure the tape at the desired measurement.

11. The invention of claim 2, wherein the measurement-securing assembly is adapted to secure the tape of the tape measure to the base of the apparatus when the tape is extended to the desired measurement.

12. The invention of claim 1, wherein the kick-up preventer extends from a top of the fence such that, when the cutting instrument is guided across the work piece, a portion of the cutting instrument passes under the fence.

13. The invention of claim 1, wherein height of the fence is adjustable.

14. The invention of claim 1, further comprising a kick-back preventer extending from the one or more of the fence and the kick-up preventer, the kick-back preventer adapted to prevent the cutting instrument from kicking back toward the user.

15. An apparatus adapted to guide movement of a cutting instrument across a work piece at a desired measurement from an edge of the work piece, the apparatus comprising:
a base having a lower surface that is substantially flat, the lower surface adapted to abut a first surface of the work piece;
an abutment member extending from a first side of the base below the lower surface, the abutment member adapted to align the apparatus with a second surface of the work piece;
a fence disposed on the base at an angle relative to the first side of the base, wherein the fence is adapted to guide the movement of the cutting instrument across the first surface of the work piece;
a kick-up preventer extending from a top of the fence away from the base such that, when the cutting instrument is guided across the work piece, a portion of the cutting instrument passes under the fence preventing the cutting instrument from kicking away from the first surface of the work piece;
a tape measure mounted above an upper surface of the base; and
a measurement-securing assembly extending above the upper surface, wherein:
the measurement-securing assembly is separate from the tape measure;
the measurement-securing assembly is adapted to secure a tape of the tape measure to the apparatus when the tape is extended to the desired measurement by applying a force to the tape; and
the measurement-securing assembly comprises an upper body that does not rotate relative to the tape, wherein an edge of the upper body provides a site guide adapted to secure the tape at the desired measurement.

16. An apparatus adapted to guide movement of a cutting instrument across a work piece at a desired measurement from an edge of the work piece, the apparatus comprising:
a base having a lower surface that is substantially flat, the lower surface adapted to abut with a first surface of the work piece;
an abutment member extending from a first side of the base below the lower surface, the abutment member adapted to align the apparatus with a second surface of the work piece;
a fence disposed on the base at an angle relative to the first side of the base, wherein the fence is adapted to guide the movement of the cutting instrument across the first surface of the work piece;
a tape-measure mount adapted to mount a tape measure above an upper surface of the base; and
a measurement-securing assembly extending above the upper surface, wherein:
the measurement-securing assembly is separate from the tape measure; and
the measurement-securing assembly is adapted to secure a tape of the tape measure to the apparatus when the tape is extended to the desired measurement.

17. The invention of claim 16, wherein:
the measurement-securing assembly comprises an upper body; and
the measurement-securing assembly secures the tape of the tape measure by applying a force to the tape.

18. The invention of claim 17, wherein:
the measurement-securing assembly further comprises a lower body;
the upper body has a lower surface adapted to contact an upper surface of the tape;
the lower body has an upper surface adapted to contact a lower surface of the tape; and
the upper and lower surfaces are curved to conform to a curvature of the tape.

19. The invention of claim 17, wherein the upper body does not rotate relative to the tape.

20. The invention of claim 17, wherein the measurement-securing assembly further comprises a plate adapted to prevent the force applied by the upper body from releasing when the tape is secured by the upper body.

21. The invention of claim 16, wherein an edge of the upper body provides a site guide adapted to secure the tape at the desired measurement.

22. The invention of claim 16, wherein the measurement-securing assembly is adapted to secure the tape of the tape measure to the base of the apparatus when the tape is extended to the desired measurement.

* * * * *

UNITED STATES PATENT AND TRADEMARK OFFICE
CERTIFICATE OF CORRECTION

PATENT NO.        : 8,695,227 B2  
APPLICATION NO.   : 13/365552  
DATED             : April 15, 2014  
INVENTOR(S)       : Gary Sherman Page 1 of 1

It is certified that error appears in the above-identified patent and that said Letters Patent is hereby corrected as shown below:

In the Claims

In column 12, line 57, replace "The invention claim 16" with --The invention of claim 17--.

Signed and Sealed this  
Twenty-third Day of September, 2014

Michelle K. Lee  
*Deputy Director of the United States Patent and Trademark Office*